3,767,672
HALOGEN ADDUCT OF ETHYLENE SULFIDE
Jose L. Villa, Heightstown, N.J., assignor to Thiokol Chemical Corporation, Bristol, Pa.
Original application May 27, 1970, Ser. No. 40,949, now Patent No. 3,582,521. Divided and this application Feb. 16, 1971, Ser. No. 115,739
Int. Cl. C07d 59/00
U.S. Cl. 260—327 E                4 Claims

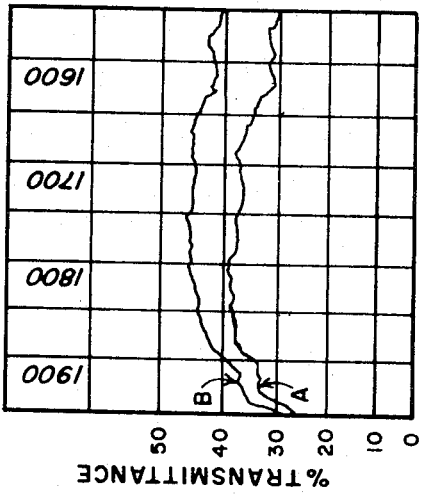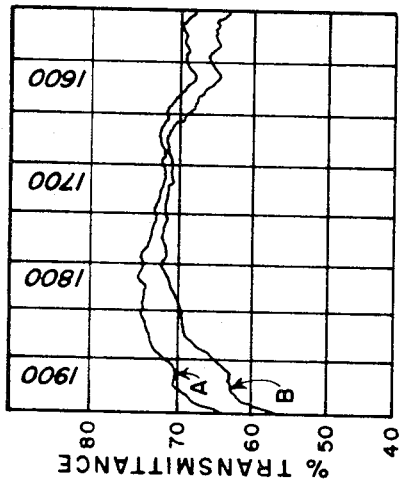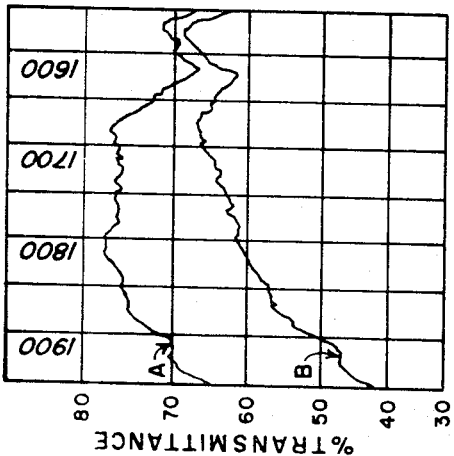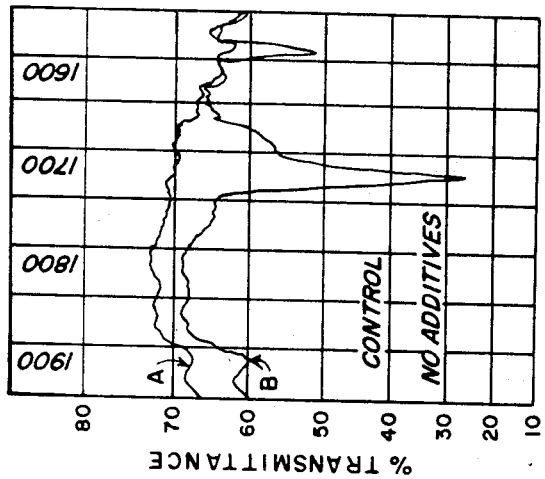

ABSTRACT OF THE DISCLOSURE

A novel halogen adduct of ethylene sulfide,

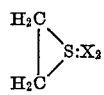

wherein X is Br, Cl or I, is prepared and used as an oxidation stabilizer in a stabilizer system for an ethylene sulfide polymer to prevent the oxidation degradation of the polymer, particularly during processing. In a preferred process the oxidation stabilizer in the system is formed in situ in the polymer by polymerizing ethylene sulfide in the presence of from about 0.04 to 4% of $Br_2$, $Cl_2$ or $I_2$. A thermal stabilizer is added also to the polymer before high temperature processing to prevent thermal degradation.

---

This is a division of application Ser. No. 40,949 filed May 27, 1970, now U.S. Pat. 3,582,521.

BACKGROUND OF THE INVENTION

This invention relates to improved polyethylene sulfide materials and an improved stabilizer system therefor. More specifically, the present invention is concerned with the preparation and use of the reaction product formed by reacting ethylene sulfide with a halogen, preferably $I_2$, as an oxidation stabilizer for ethylene sulfide polymers during and after processing of the polymers.

Recent advances in the polymer field have provided solvent resistant ethylene sulfide polymers of high molecular weight for use as high temperature injection and extrusion molding materials. Because of their good solvent resistance and high temperature melting properties, these polymers can be processed by extrusion or injection molding techniques into a variety of useful products, such as pipe, film, filament, rods, bars, gears, pumps, valves and so forth. The vigorous conditions, i.e., time and temperature usually employed when molding the polymeric materials, however, may result in some degradation of the polymer by heat and oxidation, as evidenced by changes in the color of, and/or emission of odors from and/or lowering of the melting point and/or poor melt flow characteristics of the molded polymeric material. Such undesirable changes during the processing of these polymers, if allowed to go unchecked, seriously lessen the value of the molded end products and thereby limit the overall utility of the polymer.

SUMMARY OF THE INVENTION

It is, therefore, the main object of the present invention to provide a stabilization system and methods which will protect high molecular weight ethylene sufide polymers against oxidation and thermal degradation during high temperature fabricating or processing operations.

This and other objects of the present invention are accomplished in part by incorporating in an ethylene sulfide polymer an oxidation decomposition inhibiting amount of a halogen adduct of an ethylene sulfide. The preferred adduct is represented by the formula

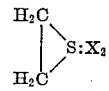

wherein X is Br, Cl or I. More particularly, the present invention provides a novel composition comprising an admixture of solid polyethylene sulfide and a stabilizing system comprising a material which provides available halogen to the polymer in situ.

In a preferred process, the adduct

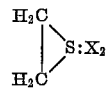

is formed in situ in the polymer by polymerizing ethylene sulfide in the presence of from about 0.04 to 4% of $Br_2$, $Cl_2$ or $I_2$, preferably $Cl_2$. Also, preferably, an additional thermal stabilizer, e.g. an organo-tin compound is added to enhance the overall stability of the polymer.

By employing this oxidation stabilizer high molecular weight ethylene sulfide polymers are protected against degradation by oxygen at all temperatures. Thus, the present invention allows the processing of solid polyethylene sulfide by injection or extrusion molding without the deleterious effects usually encountered in these and other high temperature fabricating operations, thereby consistently providing satisfactory end products substantially free of odors and physical defects.

BRIEF DESCRIPTION OF THE DRAWING

The figures of the drawing relate to the identity of the ethylene sulfide-iodine adduct and to the oxidation aging stability of stabilized polyethylene sulfides. More specifically.

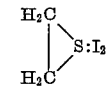

(B)

Figure 1:
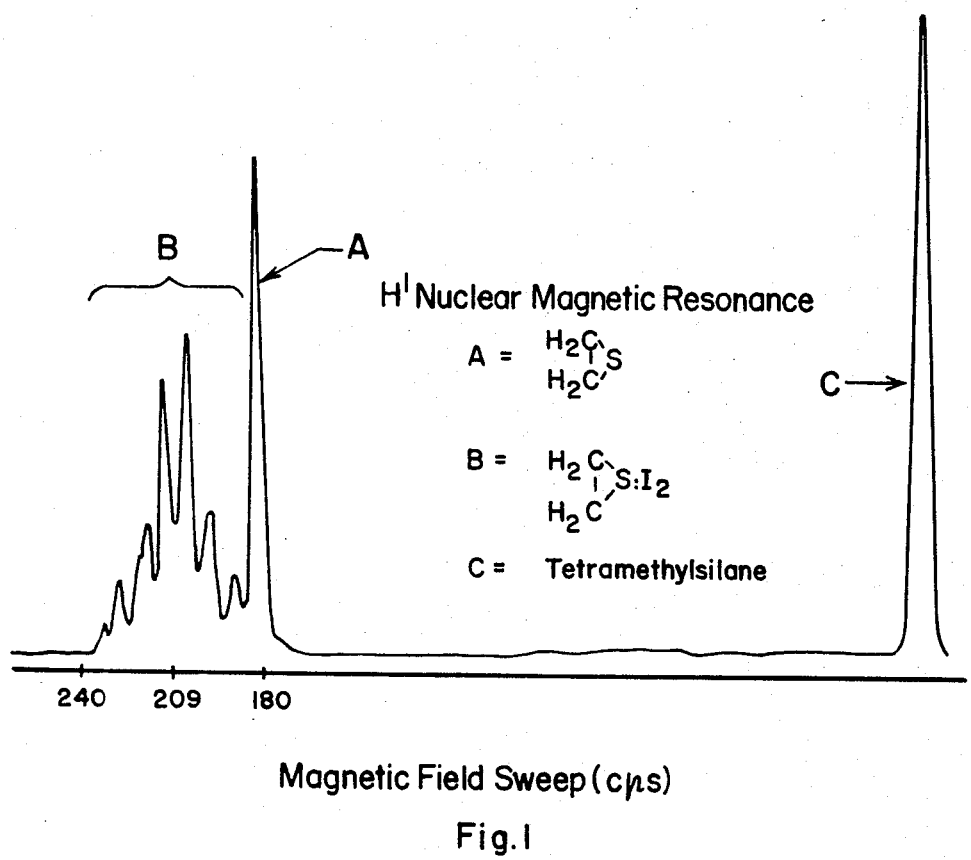
FIG. 1 is a chart trace of the nuclear magnetic resonance of the ethylene sulfide-iodine adduct.

(B) as compared to that of ethylene sulfide

(A)

FIG. 2 shows chart traces of the infra-red transmission spectra of polyethylene sulfide (A) before and (B) after aging at 150° C. for 16 hours in the presence of a current of air. The sharp drop in transmittance at wave number 1715 cm.$^{-1}$, is indicative of rupture of the polymer chain due to oxidation and is evidence of degradation of the polymer by oxidation.

FIG. 3 shows chart traces of the infra-red transmittances of samples of polyethylene sulfide stabilized with in situ formed ethylene sulfide-iodine adduct. Absence of a drop in transmittance of 1715 cm.$^{-1}$ is indicative of resistance to oxidation of the stabilized polymer.

FIGS. 4 and 5 show chart traces of the infra-red transmittances of samples of polyethylene sulfide stabilized in situ with the chlorine and bromine adducts, respectively, of ethylene sulfide. Absence of the drop in transmittance in each trace shows resistance to oxidation of the stabilized polymer.

DESCRIPTION OF THE PREFERRED EMBODIMENTS

The stabilizer system of this invention comprises an organic material which provides available halogen in the presence of a polymerized ethylene sulfide. The organic material preferably is one of the adducts,

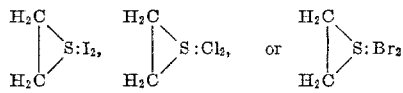

formed by reacting ethylene sulfide in an inert solvent with iodine, chlorine and bromine, respectively, in about 1:1 molar ratio at an elevated temperature, e.g. 30 to 50° C.

Each of the adducts is readily incorporated into ethylene sulfide polymer to serve as an oxidation stabilizer by admixing an organic solvent solution of the adduct, in a stabilizing amount for the polymer, with the monomeric ethylene sulfide,

before polymerizing the monomer to the polymer. The stabilizing amount advantageously ranges by weight from about 0.05 to 5 parts of the adduct per 100 parts of polymer and preferably is about 0.1 to 1.0 part. Each of the above stabilizers may be added also to the polymer after the polymer is formed. In the latter method, the stabilizer should be uniformly and completely dispersed throughout the polymer, preferably by milling, prior to the molding or other processing of the polymer In a preferred process, the adduct is formed in situ in the polyethylene sulfide by polymerizing the ethylene sulfide in the presence of an oxidation stabilizing amount of $Br_2$, $Cl_2$ or $I_2$. A stabilizing amount is advantageously from about 0.04% to 4% of $Br_2$, $Cl_2$ or $I_2$.

Since commercial polymer molding or processing techniques employ relatively high temperatures, usually ranging from about 215° to 270° C. or higher, it is desirable that any stabilizer system, whether liquid or solid, be substantially non-volatile at the molding, or other processing temperature used. The oxidation stabilizer of the present invention, whether formed in situ or added as an adduct, has been found to meet the necessary high temperature non-volatility requirement as well as to provide stability to oxidation degradation both at room temperature and when heated.

The adduct

is readily prepared by dissolving ethylene sulfide in an inert solvent, e.g. a hydrocarbon solvent such as benzene or toluene, and adding a molar equivalent of elemental iodine to the ethylene sulfide solution at room temperature and then gradually raising the temperature to 30° to 40° C. until the solution attains a permanent color, showing that no more iodine is being reacted. The ethylene sulfide reacts with the iodine in 1:1 molar ratio. The product

is recovered by evaporating the solvent and unreacted ethylene sulfide and then recrystallizing the crude product. The corresponding adduct

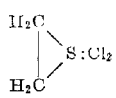

is similarly made by using a molar equivalent amount of elemental chlorine in place of the iodine. The adduct

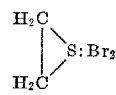

is also similarly made by using a molar equivalent amount of liquid bromine in place of the iodine.

The novel adduct, when it is to be used as a stabilizer for the ethylene sulfide polymer, may be prepared in the same organic solvent as that used in carrying out polymerization of ethylene sulfide. The stabilizer-containing solution may then be mixed into the ethylene sulfide-containing solvent before or during polymerization of the ethylene sulfide in order to ensure thorough distribution of the stabilizer throughout the polymer.

The adduct

or its analogous adducts, can also be prepared in situ in the ethylene sulfide reaction by introduction of an oxidation decomposition inhibiting amount of elemental iodine (or chlorine or bromine in the case of the other adducts) into the ethylene sulfide-containing solvent in the polymerization vessel, preferably, before beginning polymerization. Preferably, the parts of the halogen used per 100 parts of ethylene sulfide will be about 0.25 of $I_2$, 0.07 of $Cl_2$, or 0.15 of $Br_2$, respectively. For others of the ethylene sulfides disclosed herein, the amounts needed can be readily determined.

The adduct structure of

has been confirmed by nuclear magnetic resonance analysis at 56.4 $MH_z$ in saturated chloroform of a recrystallized sample of the adduct using tetramethylsilane as a standard. The adduct was found to have a resonance profile as shown in FIG. 1 of the drawing. In FIG. 1, ethylene sulfide resonance is represented by a sharp, singlet peak occurring at 180 Hertz, and

resonance is represented by a complex multiplet having minor peaks of resonance in the range between 180 and 240 Hertz, with the multiplet centered at about 209.1 Hertz. The multiplet, assigned to complexed ethylene sulfide, indicate that the four protons (H+) are no longer in an equivalent chemical environment as they are in the singlet attributable to the four protons (H+) of non-complexed ethylene sulfide,

The possibility of ring cleavage in the source of this multiplicity of resonances is eliminated by comparison of the multiplet with the chemical shifts in resonance for models such as $C_3H_6CH_2I$, $C_2H_5CH_2I$, $(C_2H_5CH_2)_2$ and $(CH_3CH_2CH_2)_2S$ Measurement of the peak areas of resonance indicates that about 30% of the particular sample tested was uncomplexed ethylene sulfide.

The solid, high molecular weight moldable ethylene sulfide polymers which may be prepared to contain the stabilizer according to the present invention may be homopolymers or they may be interpolymerization products which contain a major portion of ethylene sulfide and a minor portion of one or more other interpolymerizable monomers. Such other interpolymerizable monomers include:

(A) Vicinal episulfide monomers such as styrene sulfide and alkylene sulfides such as propylene sulfide, 1,2-butylene sulfide, isobutylene sulfide, cyclohexene sulfide, vinylcyclohexane sulfide, 2-benzylthiirane, paramethylstyrene episulfide, allyl thioglycidyl ether, thioglycidyl acrylates, thioglycidyl alkaacrylates such as thioglycidyl methacrylate, vinylcyclohexene episulfide, butadiene monoepisulfide and 1,2-epoxy-3,4-epithiobutane;

(B) Cyclic organic sulfides having the structure

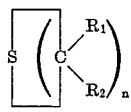

where $n=3$ to 6 and $R_1$ and $R_2$ may be H, a lower, branched or linear alkyl group having from 1 to 10 carbon atoms, an aryl, an arylalkyl and/or an alkylaryl group, and $R_1$ and $R_2$ may also be heterocyclic, alicyclic, bicyclic or polycyclic; example of such cyclic sulfides are trimethylene sulfide, pentamethylene sulfide and hexamethylene sulfide;

(C) Compounds containing ethylenic unsaturation, i.e.,

such as olefins, such as ethylene, propylene, butylene and isobutylene; conjugated and non-conjugated dienes, such as butadiene, isoprene and 1,4-pentadiene; and vinyls, such as styrene, vinyl acetate, ethyl acrylate, methyl acrylate, methyl methacrylate, butyl acrylate, acrylonitrile, vinyl isobutyl ether, α-methylstyrene hydroxypropyl methacrylate, tetrafluoroethylene, chlorotrifluoroethylene and hexafluoropropylene;

(D) Compounds having the structure $$R_3-CH\underset{X}{\overset{}{\diagup\!\!\!\diagdown}}CH-R_4$$

in which X is O or $NR_5$ and $R_3$ and $R_4$ and $R_5$ may be H, a lower branched or linear alkyl group having from 1 to 10 carbon atoms, an aryl, aralkyl, and/or alkaryl group, and $R_3$ or $R_4$ or $R_5$ may also be heterocyclic, alicyclic, bicyclic or polycyclic; examples of such compounds are styrene oxide, ethylene, propylene oxide, 1,2-butylene oxide, 2,3-butylene oxide, ethyleneimine and propyleneimine; and (E) Other compounds such as formaldehyde, trioxane, hydroxyisobutyric acid, tetrahydrofuran, 1,3 - dioxolane, 1,4-dioxane, trimethylene oxide; tetramethylene oxide and pentamethylene oxide.

These ethylene sulfide polymers may be prepared using a variety of polymerization catalysts under a variety of polymerization conditions in the presence of the adduct whether added or formed in situ. Useful polymerization catalysts include composite materials or the reaction product of two components. One component is an organometallic compound of the formula $R_2M$, wherein R is alkyl or aryl and M is zinc, cadmium or mercury. The second component, can be generally characterized as having at least one pair of unshared electrons; all substances of this type do not have the same degree of utility as a second component. One group that is especially useful comprises compounds having an active hydrogen atom including, for example, water; hydrogen sulfide; primary and secondary alkylamines; e.g., methyl, ethyl and diethyl amines; alkanols, e.g., mercaptoethanol; acetone; lower fatty acids, e.g., acetic acid; and aldehydes, e.g., butyraldehyde. Additionally, catalysts employing as the second component or co-catalyst elemental oxygen or sulfur, carbonyl sulfide and carbon disulfide are useful. A typical, preferred, useful catalyst includes the reaction product of diethylzinc and water.

These composite polymerization catalysts may be prepared by reacting the two components in a suitable inert liquid reaction medium such as benzene, hexane, tetrahydrofuran, petroleum ether or mineral oil, employing a molar ratio of co-catalyst to organometallic component in the range of about 0.5:1 to 3:1. Reaction temperatures may vary from about −20° C. to 100° C.

For more satisfactory catalyst activity and desirable polymer properties, freshly prepared catalyst should be used. The catalyst may be prepared directly in the polymerization reaction vessel prior to or coincident with the initiation of the polymerization reaction. If it is necessary to store the catalyst for an appreciable period of time before it is used, say 48 hours or more, the prepared catalyst can best be maintained by storage at low temperatures.

Since oxygen or water may function as co-catalysts, the catalyst preparation reactions and the polymerization reactions should be carried out in an oxygen- and water-free environment; except in the cases when those substances are used as catalyst components. Catalyst preparation reactions and polymerization reactions are generally conducted in an atmosphere of inert gas, such as, nitrogen, helium or argon.

The polymerization is generally carried out by any of the wide variety of polymerization techniques whereby the monomer or monomers are contacted with the catalyst in the presence of the stabilizer of this invention. It is preferable, in order to obtain optimum results, that the starting monomeric materials be freshly distilled just prior to use from a reducing agent, e.g., calcium hydride, to remove oxidation products and water therefrom. A catalyst concentration with the ranges of about 0.05 to 3% by weight of the monomer mixture is useful. The polymerization reaction temperature is equally within the range of about −20° to 150° C.

Polymerizations may be conducted in any of various substantially bulk, solvent, solution, vapor phase, or other polymerization technique conventionally employed. Solvent polymerization techniques are especially useful, and typical solvents useful for this purpose include aromatic hydrocarbons, e.g., benzene, toluene or xylene; aliphatic hydrocarbons, e.g., isopentane, n-hexane or octane; chlorinated hydrocarbons, e.g. carbon tetrachloride, methylene chloride or ethylene chloride; ethers, e.g., diethyl ether, dioxane, or tetrahydrofuran.

Homopolymers and interpolymers of a more granular nature than those prepared as described above and which have better handling properties may be produced using a "seed catalyst" system. In the "seed catalyst" procedure the organometallic compound/co-catalyst material (in about 1:1 mol ratio) is used to polymerize the episulfide monomer charge in solution in the presence of

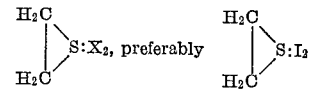

at room temperature. About 0.05 to 10 mol percent catalyst based on the monomer charge is used in the presence of from about 0.05 to 5 parts of

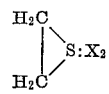

or from about 0.04 to 4% of halogen when in situ stabilization is done. Solution polymerization with solvents e.g. tetrahydrofuran, petroleum ether, benzene and toluene, is used. The resultant polymerization product contains all the catalyst and stabilizer initially charged. The stabilized polymer product is then recovered, dried, and converted to a granulated polymer product having particles of less than about 20 mesh in size. The granulated polymer product containing the original catalyst charge is a "seed catalyst" which may be used to polymerize ethylene sulfide alone or with other monomers in the presence of

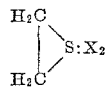

or halogen to form granular powders. About 1 to 5% by weight of the seed catalyst is used based on the monomer charge. The seed catalyst based polymerization is generally conducted at temperatures of about 170° F. to 185° F. for about one to three hours. The yields of the granular polymer obtained are about 80–100%. The stabilized seed catalyst polymer and the stabilized polymer produced therewith have essentially the same characteristics, and they may be used in subsequent molding operations without separating one from the other.

Other catalysts useful in the preparation of moldable stabilized ethylene sulfide polymers include cadmium compounds, such as hydroxides, sulfides, silicates, chromates, adipates, sulfates and carbonates of cadmium; zinc and mercury compound, such as peroxides, sulfides, chromates, adipates, oxolates, oxides, hydroxides and carbonates of zinc and of mercury; carbonates of manganese, lead, cadmium, cobalt and nickel; oxides and silicates of other metals, such as $Na_2O$, $Na_2O_2$; $Na_2SiO_3$; $MgO$; $Al_2O_3$; $K_2O$, $K_2O_2$; $CaO$, $CaO_2$; $Fe_2O_3$; $CoO$; $NiO$; $SrO$; $SrO_2$; $Sb_2O_3$; $BaO$, $SnO$, $PbO$, $PbO_2$ and $Bi_2O_3$. Other catalyst systems also useful in the preparation of moldable polymers which may be stabilized according to the present invention include Friedel-Crafts catalysts such as sulfuric acid and boron trifluoride; ionizing radiation; sodium naphthenate; sodium cyanide; metal alkyls such as butyl lithium and metallic sodium dispersions.

The catalysts mentioned above may be used in a variety of polymerization procedures in the presence of

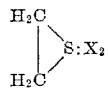

and of halogen to produce stabilized ethylene sulfide homopolymers or graft, random or block interpolymers of ethylene sulfide and one or more monomers interpolymerizable therewith.

The determination of the oxidation stabilizer properties of the adduct of the invention can be made by means of melt index studies and by infra-red analysis of polymer made with and without the stabilizer.

Melt index studies are useful in indicating the stabilizing effects of materials added to moldable ethylene sulfide polymers. The melt index value may be defined as an empirical measure of the melt flow properties of a polymer and in turn is indicative of its molecular weight. Since oxidative and/or thermal degradation of a polymeric material generally results in a decrease in molecula weight, melt index values are useful also as an indication of such polymer degradation. Because these values are related to molecular weight and because molecular weight can vary widely, comparisons of melt index values should be limited to polymers having approximately the same molecular weights.

The melt index data shown in the accompanying examples compare the results obtained using ethylene sulfide polymers stabilized with one of several of the oxidation stabilizers of the present invention, in contrast to ethylene sulfide without such stabilizer.

In the following examples, the melt index values were determined using a standard technique. Melt index properties were measured using a lapillary flow plastometer of the type specified in ASTM Method D1238–571 and sold by F. F. Slocomb Corporation of Wilmington, Del. In accordance with this method, the reservoir of the instrument was preheated and maintained at a specified temperature, and was then charged with about 8 grams of sample in about three minutes. A 5 kilogram weight was then placed on top of the charge by means of a ram to compact the sample and allowed to remain there for a period of time, which, in combination with the charging time, would total about 6 minutes. After this time interval, it was replaced with a 2.160 kilogram weight. The plug was removed from the flow orifice and the amount of sample which flowed through the orifice in each minute interval thereafter was collected and accurately weighed to the nearest miligram. When the second stabilizer was used, the components of the stabilizer system, at the concentration level indicated in the examples, were intimately mixed with a separate portion of the ethylene sulfide polymer for about 10 minutes using a Waring Blender to effect a uniform powdery blend. In the examples, the term "total flow time" refers to the total number of minutes required for the polymer sample to flow out of the plastometer.

The following examples are illustrative of the present invention and are not intended as a limitation upon the scope thereof.

EXAMPLE 1

Preparation of ethylene sulfide-iodine adduct 34 g. (0.5 mole plus 10% excess) of freshly distilled ethylene sulfide were dissolved in 100 ml. of benzene in a 300 ml. two necked flask fitted with condenser and thermometer. The contents of the flask were stirred with magnetic stirrer means. Gradual addition of 0.5 mole (77 g.) of iodine crystals ($I_2$) was then begun while stirring the flask contents at 22° C. As the iodine was added, it imparted a red color to the solution in the flask. The color cleared to water white as the reaction proceeded. The temperature rose slowly with each addition of $I_2$. At 35° C., cooling of the flask was begun, and the flask contents were maintained at 30–35° C. throughout the addition of $I_2$. By the time 64.6 g. of $I_2$ had been added, the solution had become a deep red color which did not clear. Ethylene sulfide was added dropwise to the solution in the flask until the color cleared to water white. The reaction mass then was allowed to stand overnight at room temperature with stirring. The next day the mass was still water white and a small amount of dark yellow to dark red resin had collected on the walls of the flask. The reaction mass was transferred to another vessel and the solvent and other room temperature volatiles evaporated at room temperature. A thick viscous liquid was recovered. The liquid was placed in a refrigerator overnight. A yellow solid formed. The solid was dissolved in benzene and hexane was then added to a cloud point. The solution was then placed in a refrigerator to crystallize. The crystals which formed were filtered off and dried in a vacuum oven at room temperature under a stream of nitrogen. The yield of crystals was 67.7 g. (75.4% based on ethylene sulfide). The crystals has a melting point of 27 to 30° C. Five grams of the crystals were recrystallized twice from benzene and hexane. One gram of white flaky solid was recovered. The melting point, determined under a microscope, was 42 to 51° C.

EXAMPLE 2

Preparation of ethylene sulfide polymer for melt index comparison standard (A) Preparation of seed catalyst: Under a nitrogen atmosphere the following reactants were added, in the order presented, into a 2½ gallon solution bottle: 2835 ml. of tetrahydrofuran and sufficient diethylzinc to effect a 1:1 mol ratio with 9.838 ml. of water added subsequent to the diethylzinc. The materials were agitated by sparging with nitrogen. Into a second vessel, a clean dry reactor, purged with nitrogen, 51.9 pounds of petroleum ether were added and then charged with 6.49 pounds of ethylene sulfide. The temperature of the reactor was then adjusted to 78±2° F. and the entire above prepared solution of tetrahydrofuran, diethylzinc and water added. The reactor was then agitated for one hour at the above temperature. The polymer thus produced was centrifuged out and subsequently dried for 3 hours at 160 to 180° F. under reduced pressure. The dried polymer was then compacted and pulverized to pass through a #40 screen. A yield of 1.3 pounds of seed catalyst polymer was thereby obtained. Total flow rate was about 7.7 minutes.

(B) Preparation of the polymer: A suitable sized reactor was purged with nitrogen for 15 minutes and charged with 120 pounds of petroleum ether and 60.1 pounds of ethylene sulfide in the order presented. An additional 50 pounds of petroleum ether was then charged into the reactor to completely flush the ethylene sulfide from the charging lines into the reactor. The seed catalyst, prepared in (A), above, was then charged into the reactor, the nitrogen shut off, the reactor sealed and the temperature raised to 176±5° F. in 1½ hours. The polymerized mass and solvent was then cooled to less than 100° F. The ethylene sulfide polymer was separated from the solvent by centrifuging and dried under reduced pressure for four hours at about 190° F. A yield of about 80% based on ethylene sulfide used was obtained. The melt index of the ethylene sulfide polymer at 220° C. was a total flow time of 9.6 minutes. Approximate molecular weight was about 340,000.

EXAMPLE 3

Preparation of ethylene sulfide polymer stabilized against oxidation and thermal degradation by in situ formed ethylene sulfide-iodine adduct via stabilized seed catalyst (A) Preparation of stabilized seed catalyst: Under a nitrogen atmosphere the following reactants are added, in the order presented, into a 2½ gallon solution bottle: 2835 mol of tetrahydrofuran and sufficient diethylzinc to effect a 1:1 mol ratio with 9.838 ml. of water are added, subsequent to the diethylzinc. The materials are agitated by sparging with nitrogen. Into a second vessel, a clean dry reactor, purged with nitrogen, 51.9 pounds of petroleum ether are added and then charged with a mixture of 6.49 pounds of ethylene sulfide and 0.06 pound of iodine. The temperature of the reactor is then adjusted to 78±2° F. and the entire above prepared solution of tetrahydrofuran, diethylzinc and water is added. The reactor is then agitated for one hour at the above temperature. The stabilized polymer thus produced is centrifuged free of liquid and subsequently is dried for 3 hours at 160° to 180° F. under reduced pressure. The dried polymer is then compacted and pulverized to pass through a #40 screen. A yield of about 1.312 pounds of stabilized seed catalyst polymer is thereby obtained. The stabilized polymer consists of polyethylene sulfide containing in situ formed ethyl sulfide-iodine adduct.

(B) Preparation of the stabilized polymer: A suitably sized reactor is purged with nitrogen for 15 minutes and charged with 120 pounds of petroleum ether and 60.1 pounds of ethylene sulfide in the order presented. A solution of 0.6 pound of iodine dissolved in sufficient petroleum ether to form a solution is then added to the solution in the reactor. An additional 50 pounds of petroleum ether are then charged into the reactor to completely flush the ethylene sulfide and iodine from the charging lines into the reactor. The seed catalyst, prepared in (A), above, is then charged into the reactor; the nitrogen is shut off; the reactor is sealed and the temperature is raised to 176°±5° F. over about 1½ hours. The reaction is continued at this temperature for about two additional hours. The polymerized mass of stabilized polymer thus formed and solvent are then cooled to temperature below about 100° F. The polymer mass is separated by centrifuging from the solvent medium. The recovered stabilized polymer then is dried under reduced pressure for four hours at about 190° F. The yield of stabilized ethylene sulfide polymer, based on ethylene sulfide consumed, is about 80%. The melt index of the stabilized polymer at 220° C. is about 30 minutes. The stabilized polyethylene sulfide as does the seed polymer in (A), above, contains in situ formed ethylene-iodine adduct which serves to stabilize the polymer against oxidation. Approximate molecular weight is about 235,000. The oxidation stabilized ethylene sulfide polymer is further stabilized by addition of a thermal stabilizer as later described and ready for processing by known molding and extrusion means into a shaped article, e.g. flexible tubing, useful as a water hose. The stabilized polyethylene sulfide contains about 2.3% of $I_2$, or about 2.8% of its equivalent ethylene sulfide adduct,

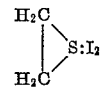

EXAMPLE 4

Addition of iodine to ethyl sulfide polymer after polymerization

Approximately 20 g. of pulverized polyethylene sulfide made as described in Example 2(B) was added to an iodine solution of benzene containing 20 mg. of $I_2$. The iodine-benzene solution turned from its red iodine color to a colorless solution. The polyethylene sulfide retained its original white color. The mixture was allowed to stand for about two days. The benzene solvent was then recovered, fresh benzene and the washings were combined with the original benzene solvent. The combined solvents were evaporated to dryness. No residue was recovered. This result indicated that the iodine had been combined with the polymer. The melt index of the iodine treated polyethylene sulfide was determined at 220° C. to be a flow rate of only 0.8 minute, compared to the expected flow rate of 7.7 minutes determined in Example 2(B). Analysis of the recovered iodine treated polymer for iodine content showed the presence of 2.55% of $I_2$ by weight. The iodine treated polymer melted at 205 to 207° C.

The difference between the melt index of this iodine treated polyethylene sulfide (0.8 minute) and the melt index of the stabilized polymer of Example 3(B) (30 minutes) shows that the product of Example 3(B) is different in its physical properties from the iodine treated polysulfide polymer of the present example and that the two products are not identical in chemical structure. Furthermore, the product of the present example is not stable to oxidation, and also is not stable to thermal decomposition as evidenced by its extremely low melt index.

However, when the polymer was pressed into a film, and flame was applied to the film, the film was found to be fire resistant. This test confirms that the presence of halogen in the composition improves the fire resistance compared to polyethylene sulfide which contains no halogen and which is readily combustible.

EXAMPLE 5

Preparation of stabilized polyethylene sulfide by polymerization of ethylene sulfide in presence of elemental iodine Stabilized polyethylene sulfide was prepared without use of the seed catalyst by polymerizing (substantially as described in Example 3(A) 100 ml. of ethylene sulfide in 400 ml. of toluene in the presence of 0.57 ml. of diethylzinc catalyst solution (1.11 moles), 0.02 ml. of deionized water and 250 mg. (0.98 mmole) of $I_2$ in toluene (2.5% solution). The iodine was added to the ethylene sulfide and the resulting mixture was added to the dispersion formed by mixing the diethylzinc, water and toluene. Polymerization of the ethylene sulfide in the resulting mass was carried out at 80° C. over a two hour period. A yield of 48.6 grams of stabilized polyethylene sulfide was recovered. The degree of stabilization against oxidation was indicated to be high by the melt index at 220° C., which was found to be a total flow rate of 12.6 minutes. The molecular weight of the stabilized polyethylene sulfide was found to be about 195,000.

EXAMPLE 6

Preparation of stabilized polyethylene sulfide by polymerization of ethylene sulfide in presence of elemental bromine Stabilized polyethylene sulfide was prepared by polymerizing (substantially as described in Example 3(A) 100 ml. of ethylene sulfide in 400 mls. of toluene in the presence of 1.71 ml. (1.11 mmoles) of diethylzinc catalyst solution, 0.02 ml. (1.11 mmoles) of deionized water, and 156 mg. $Br_2$ (0.98 mmole). The $Br_2$ was added to the ethylene sulfide and the resulting mixture was added to the mixture formed by mixing together the toluene, catalyst and water. Polymerization of the ethylene sulfide in the resulting mass was carried out over a 2 hour period at 80° C. A yield of 80.7 grams of stabilized polyethylene sulfide was recovered. The melt index was determined and found to be a total flow rate of 4 minutes. The molecular weight was determined to be about 110,000.

In view of the low melt index rating, which is attributed to thermal decomposition a further deterimnation of stability to oxidation was made by subjecting the stabilized polyethylene sulfide to a film oxidation aging test. In the film test, a film form of sample of the polymer is placed in a chamber heated at a constant temperature of 150° C. for 16 hours. Hot air is blown through the chamber during the entire test period. The test sample is subjected to infra-red analysis before and after the aging test. The sample of polyethylene sulfide stabilized as described above with bromine present during polymerization of the ethylene sulfide was found to show no occurrence of oxidation during the test period. The infra-red chart traces are shown in FIG. 5 of the drawing. It is seen that no oxidation breakdown has occurred at the 1715 line of the trace, whereas a breakdown is indicated to occur in the chart trace of the control sample shown in FIG. 2.

EXAMPLE 7

Preparation of stabilized polyethylene sulfide by polymerization of ethylene sulfide in presence of elemental chlorine Stabilized polyethylene sulfide was prepared by polymerizing (substantially as described in Example 3(A)) 100 ml. of ethylene sulfide in 400 ml. of toluene in the presence of 2.52 gm. of diethylzinc seed catalyst solution (1.11 mmole) prepared as described in Example 2(A), 0.02 ml. of deionized water, and 2.9 ml. 0.069 mg., (0.98 mmole) of $Cl_2$ dissolved in $CCl_4$. The $Cl_2/CCl_4$ solution was added to the ethylene sulfide and the resulting mixture was added to the mixture formed by mixing together the toluene, catalyst and water. Polymerization of the ethylene sulfide in the resulting mass was carried out over a 2 hour period at 80° C. A yield of 66.8 grams of stabilized polyethylene sulfide was recovered. The degree of stabilization against oxidation was indicated to be high by the melt index at 220° C., which was found to be a total flow rate of 16.8 minutes. The molecular weight of the stabilized polyethylene sulfide was found to be 925,000.

The stability to oxidation aging of the stabilized polyethylene sulfide was determined by the film oxidation test to be high, showing no oxidation breakdown of the infrared trace at the 1715 line of the chart trace as shown in FIG. 4 of the drawing.

EXAMPLE 8

Preparation of stabilized polyethylene sulfide using seed catalyst and elemental iodine (a) Stabilized polyethylene sulfide containing diethylzinc catalyst for use as seed catalyst in subsequent polymerization of ethylene sulfide in the presence of iodine was made substantially as described in Example 5 except that the following proportions of reactants and solvent were used, 400 ml. of tetrahydrofuran, 26.9 ml., (44.4 mmole) of diethylzinc solution, 0.8 ml. (44.4 mmole) of water, 800 ml. toluene, 100 ml. of ethylene sulfide and 10 ml. of $I_2$ as 2.5% solution in toluene (0.25 mg. $I_2$). The yield of stabilized polyethylene sulfide seed catalyst was 101 g.

(b) Seed catalyst as prepared in (a) above was used in the preparation of more stabilized polyethylene sulfide. 2.52 grams of the seed catalyst were mixed with 3 ml. of a 10% water solution in tetrahydrofuran and 10 ml. of 2.5% $I_2$ in toluene solution (250 mg., 0.98 mmole). The mixture was added to a mixture of 100 ml. of ethylene sulfide in 400 ml. of toluene. Polymerization was carried out at 80° C. for 2 hours. The yield was about 100 grams of stabilized polyethylene sulfide. Melt index determination showed a total flow rate of 14.8 minutes. The approximate molecular weight was 235,000.

(c) Oxidation aging of a film of the polymer was determined by the film oxidation test. The infra-red traces of the sample before and after aging is shown in FIG. 3 of the drawing. It is seen, by the absence of a valley at the 1715 line of the trace that no oxidation had occurred.

The stabilized polyethylene sulfide products of this invention are primarily stabilized against oxidation. However, they also are stable against thermal decomposition as is shown by the heating for 16 hours at 150° C. in the film oxidation test. For greater thermal stability, particularly at higher processing temperatures, it has been found advantageous to add a thermal stabilizer additive to the oxidation stabilized polyethylene sulfide after it has been prepared. Particularly advantageous additives are the tin compounds taught by Catsiff et al. in Defensive Publication No. 656,370, published Nov. 12, 1968, 856 O.G. 336 incorporated herein by reference. Specifically, the thermal stabilizer is a tin compound selected from oxides, carbonates, hydroxides, halides and sulfates of tin; alkali metal stannates; hydrocarbyl tin and its hydroxides, oxides, acids and mercaptoethers; hydrocarbyl tin acid salts; and stannous esters of mono- and polycarboxylic acids. Preferred thermal stabilizers are dibutyl tin oxide, diphenyltin oxide, phenylstannoic acid and butyl stannoic acid.

When the thermal stabilizer additive is added to the oxidation stabilized polyethylene sulfide, the melt index of the resulting doubly stabilized polymer is further improved in that the total flow rate increases by about 1 to 3 times over that obtained when only the oxidation stabilizer of the invention is present in the polymer. Thus, whereas the control polyethylene sulfide of Example 2(A) has a total flow rate of 9.6 minutes and the oxidation stabilized, iodine adduct-containing, polyethylene sulfide of Example 5 has a total flow rate of 12.6 minutes, the polymer product of Example 5, when additionally thermally stabilized with 2% by weight of dibutyl tin oxide may be expected to have a total flow rate of about 24 minutes. Similar advantageous enhancement of the overall stability of the oxidation stabilized polyethylene sulfide is obtained with the chlorine- and bromine-adduct-containing polymers.

Films made of the oxidation stabilized polyethylene sulfides are found to have improved fire-resistance over the non-oxidation stabilized polyethylene sulfide.

I claim:

1. A compound which is represented by the formula

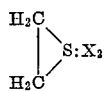

wherein X is selected from Br, Cl and I.

2. 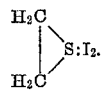

3. 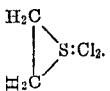

4. 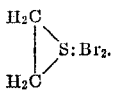

References Cited
UNITED STATES PATENTS
2,695,286  11/1954  Dearborn _____ 260—327

HARRY I. MOATZ, Primary Examiner